May 10, 1960     M. KLEMINSKY     2,936,137
AIRPLANE BALANCING DEVICE

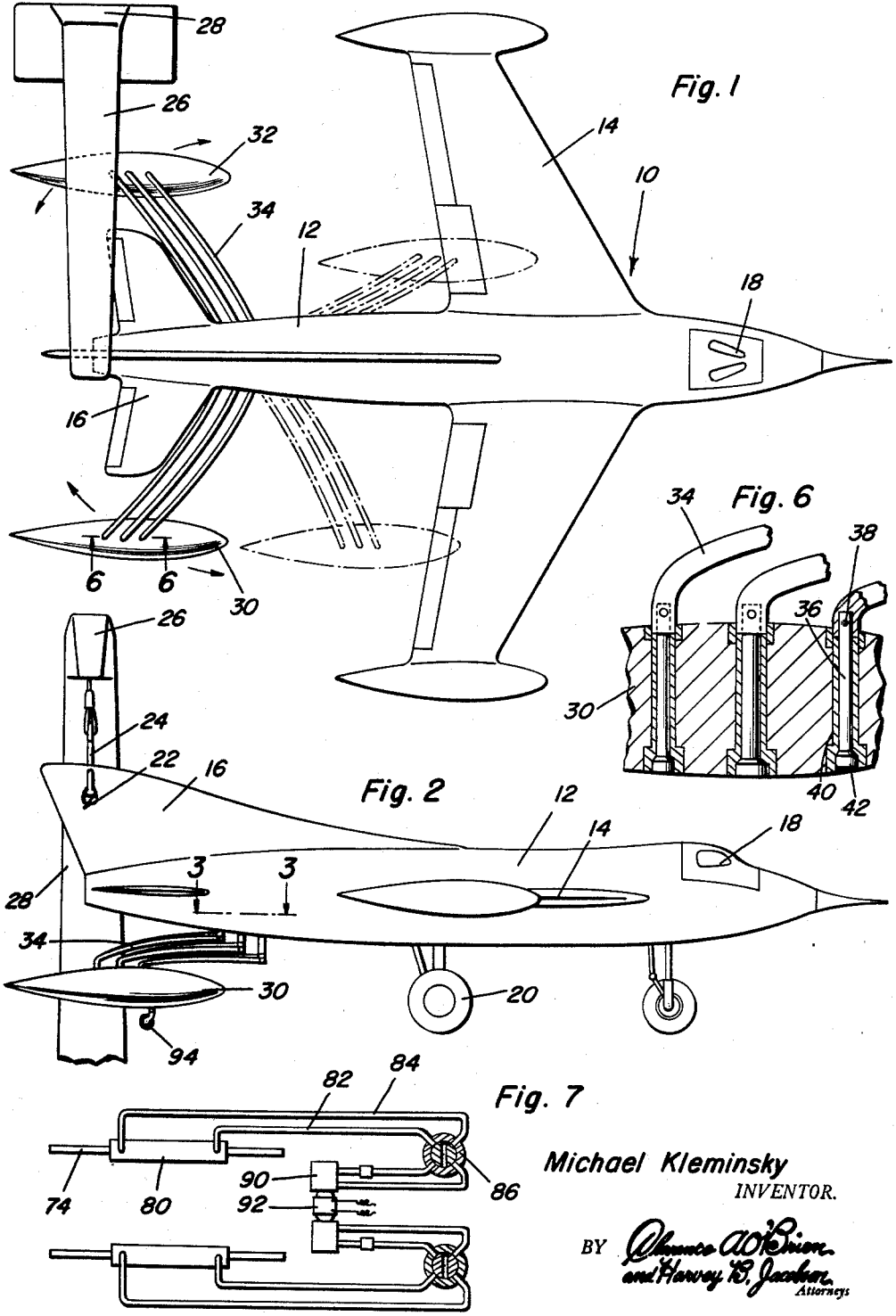

Filed July 18, 1955                     2 Sheets-Sheet 2

Michael Kleminsky
INVENTOR.

BY

United States Patent Office 2,936,137

AIRPLANE BALANCING DEVICE

Michael Kleminsky, McAdoo, Pa.; Anna K. Chomo, administratrix of said Michael Kleminsky, deceased Application July 18, 1955, Serial No. 522,653

2 Claims. (Cl. 244—93)

This invention generally relates to an airplane balancing device, and more specifically provides improved and novel construction in an aircraft wherein the aircraft may be controlled and balanced for facilitating the control of the aircraft during its flight and for balancing the aircraft for suspending the aircraft from its tail assembly on a supporting tower or the like.

An object of the present invention is to provide an airplane balancing device including means for shifting the center of gravity of the aircraft, thereby controlling the flight of the aircraft and balancing the aircraft when it is stationary, thereby permitting the aircraft to be suspended from a support by its tail assembly to facilitate the loading and unloading operation thereof and also to provide control for the flight of the aircraft to make the aircraft safer in operation.

Another object of the present invention is to provide an airplane balancing device incorporating in its construction a pair of laterally and longitudinally movable weights supported on swingable arms mounted for movement about vertical axes wherein the center of gravity of the airplane may be shifted laterally and longitudinally for controlling the center of gravity of the airplane, thereby controlling the flight of the airplane.

Another important object of the present invention is to provide an airplane balancing device which will provide an airplane which is safer in operation, easily supported from a suspending hook at the tail assembly, well adapted for its intended purposes, and relatively inexpensive to maintain and repair.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the aircraft utilizing the airplane balancing device of the present invention;

Figure 2 is a side elevational view of the construction of Figure 1;

Figure 6 is a detailed sectional view taken substantially upon a plane passing along section line 6—6 of Figure 1 illustrating the manner of connecting the supporting arms to the movable weights; and Figure 7 is a schematic illustration of the hydraulic control means for moving the movable weights.

Figure 3:
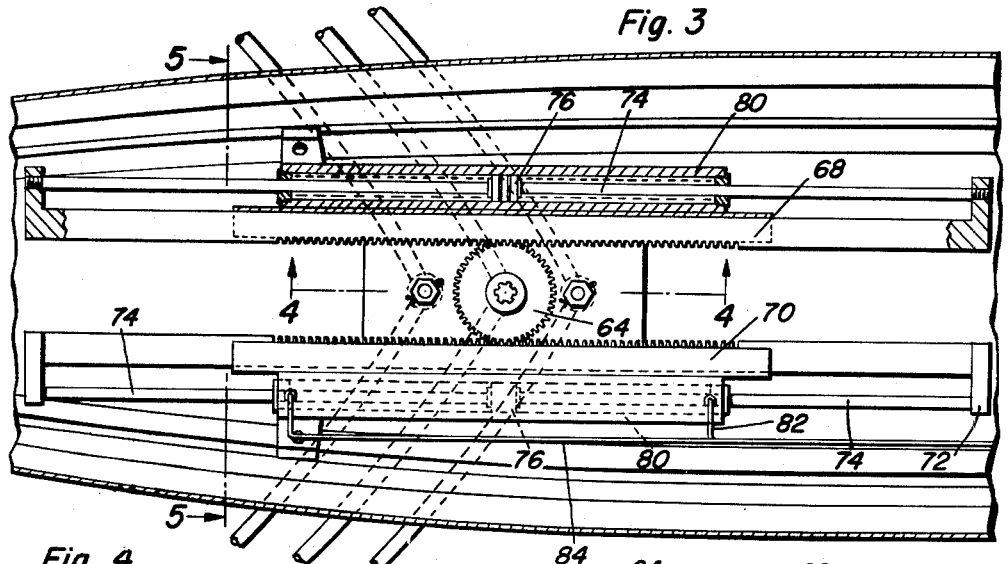
Figure 3 is a detailed sectional view taken substantially upon a plane passing along section line 3—3 of Figure 2 illustrating the details of the control mechanism for the movable weights.
Figure 4:
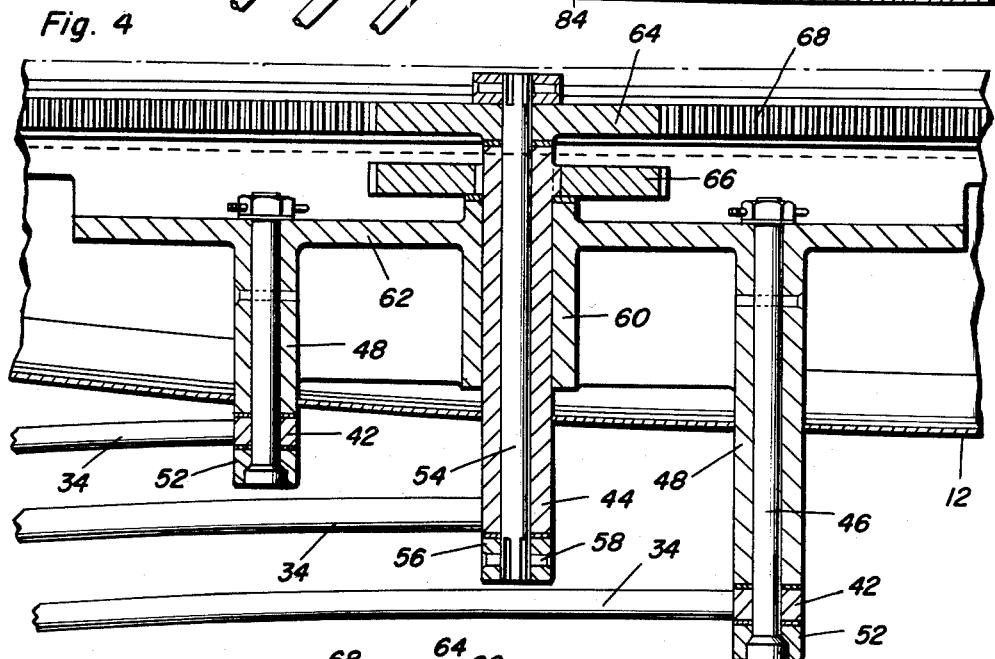
Figure 4 is a sectional view taken upon section line 4—4 of Figure 3 illustrating further details of the control mechanism.
Figure 5:
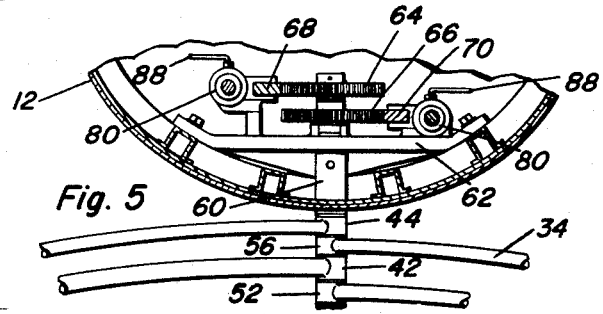
Figure 5 is a transverse, vertical sectional view illustrating the relationship of the control gears and the movable racks for moving the arms.

With reference to the accompanying drawings, the numeral 10 generally designates an aircraft having a generally elongated fuselage 12 with laterally projecting wings 14 adjacent the forward end thereof and a tail assembly 16 at the rear end thereof together with a cockpit 18 for the pilot of the aircraft 10 and landing wheels 20 normally provided on an aircraft which is also provided with suitable power and control mechanism (not illustrated). The tail assembly 16 is provided with an aperture 22 therein for receiving a supporting hook 24 mounted on a horizontally projecting arm 26 of a supporting tower 28 thereby suspending the fuselage 12 from the tower 28.

Mounted on the fuselage 12 adjacent the rear thereof and just forwardly of the tail assembly 16 is a pair of movable weights 30 and 32, each of which are supported on a plurality of mounting arms 34 wherein the arms 34 terminate in a vertical portion 36 having a detachable connection 38 with the arms 34 wherein the vertical portion 36 extends through a bearing 40 in the respective weights 30 or 32 and terminates in a headed portion 42 wherein the vertical portion 36 of the arms 34 is rotatably retained in the bearings 40, thereby rotatably supporting the arms 34 in relation to the weights 30 to permit pivotal movement therebetween wherein the arms 34 may swing up in substantially a horizontal plane so that the weights 30 and 32 will be moved both longitudinally and laterally about an arc formed by the arms 34.

The inner ends of two of the arms 34 are provided with relatively narrow cylindrical portions 42 while the central arm 34 is provided with an elongated cylindrical portion 44. The two outer arms 34 having the portions 42 thereon are supported on vertical rods 46 extending in a depending projection 48 on the fuselage 12 wherein the rod 46 is provided with a headed portion 50 rotatably retaining the cylindrical portion 42 between the outer portion 52 and the inner portion of the depending projection 48 on the fuselage 12.

The central arm 34 having the cylindrical member 44 thereon is supported on an elongated rod 54 having a keeper 56 secured to the bottom end thereof by a fastener 58, thereby forming a bearing surface for the elongated cylindrical member 44 which also is received within a cylindrical boss 60 formed integrally with a supporting plate 62 which also supports the members 48 on the fuselage 12. The keeper 56 below the cylindrical member 44 is actually the inner end of the central arm 34 of the opposite weight wherein the two central arms are mounted on the same shaft 54. Also, the lower ends 52 of the tubular extensions 48 are actually the inner ends of the forward and rear arms 34 of the opposite weight wherein the inner ends of each pair of arms are mounted concentrically. The upper end of the rod 54 having the member 56 rigidly secured thereto by fastener 58 is provided with a spur gear 64 and the upper end of the cylindrical portion 44 is provided with a spur gear 66 and the spur gear 64 is in meshing engagement with an elongated rack 68 and the spur gear 66 is in meshing engagement with an elongated rack 70. Each of the elongated racks 68 and 70 is provided with a laterally extending outer end 72 at each end thereof which is connected to inwardly extending rods 74 which are in spaced parallel relation to the racks wherein the rods 74 terminate in a piston 76 at the center thereof which is slidably received within a cylinder 80 having a fluid pressure line 82 connected to one end thereof and a fluid pressure line 84 connected to the other end thereof, wherein the fluid pressure lines 82 and 84 are connected to a control valve 86 having a control handle 88 which selectively communicates the fluid conduits 82 and 84 with a fluid pump 90 driven by a suitable electric motor or the like 92. The control for each of the racks 68 and 70 is identical, thereby permitting individual adjustment of the weights 30 and 32 by manipulation of selective handles 88 on the valve 86.

When it is desired to actuate one of the weights 30 or 32, one of the valve handles 88 is moved for communicating the pressurized fluid with one end of the cylinder 80 for moving the rack 68 or 70 in longitudinal relation thereby rotating either the rod 54 or the cylindrical member 44 in surrounding relation thereto thereby pivoting one of the central arms for moving one of the weights 30 or 32.

This will permit the center of gravity of the aircraft 10 to be shifted during flight, thereby retaining the flight of the aircraft in a level condition or shifting the center of gravity so that the tail of the aircraft will be heavier, thereby forcing the nose of the aircraft upwardly. By shifting the weights 30 and 32, the flight of the aircraft may be more accurately and safely controlled. Also, the weights 30 and 32 may be shifted so that the entire aircraft 10 may be supported from the supporting hook 24 of the tower 28, thereby facilitating the loading and unloading of the aircraft and permitting more efficient operation of landing fields and the like. Also, it is noted that the weights 30 and 32 may each be provided with a small landing wheel 94 which may engage the supporting surface wherein the landing wheel 94 is substantially in the same plane as the landing gear 20 of the fuselage 12, thereby affording additional support for the fuselage 12, and the weights may be fuel tanks or pontoons.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an aircraft construction having an elongated fuselage with landing gear, laterally projecting wings, a tail assembly, propulsion means, and control means for guiding the flight of the aircraft; that improvement of a balancing device mounted on the fuselage, said balancing device comprising a pair of arm assemblies supported on the fuselage for pivotal movement about coincidental vertical axes spaced rearwardly of the normal balance center of the fuselage for movement in a general horizontal plane, a weight on the outer end of each arm assembly for arcuate swinging movement for varying the balance center of the aircraft, the length of the arm assemblies and weights mounted thereon being sufficient to counteract the weight of the aircraft exerting a force about a point on the tail assembly whereby the aircraft may be suspended from the tail assembly with the fuselage maintained in a substantially horizontal plane when the weights are in the rearmost position, and means independently controlling said arm assemblies and moving said weights in independent relation for shifting the balance center longitudinally and laterally of the aircraft.

2. The combination of claim 1 wherein said control means includes an elongated rack gear connected to each of said arm assemblies for swinging the same in response to movement of said rack gears, an elongated rod rigidly attached to each rack gear in spaced parallel relation, a stationary cylinder encircling a portion of said rod, and a piston on said portion of the rod received in the cylinder and coacting with the cylinder for providing a double-acting fluid pressure piston and cylinder arrangement for moving said rack gears longitudinally for swinging the arms in response to movement of the rod.

References Cited in the file of this patent
UNITED STATES PATENTS

| | | |
|---|---|---|
| 1,906,018 | Sundling | Apr. 25, 1933 |
| 2,158,686 | Barnhart | May 16, 1939 |